(12) United States Patent
Yokogawa

(10) Patent No.: US 9,352,408 B2
(45) Date of Patent: May 31, 2016

(54) SOLDER JOINT STRUCTURE AND SOLDER JOINING METHOD

(71) Applicant: Nidec Corporation, Kyoto (JP)

(72) Inventor: Tomoyoshi Yokogawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 288 days.

(21) Appl. No.: 14/024,830

(22) Filed: Sep. 12, 2013

(65) Prior Publication Data

US 2014/0126956 A1     May 8, 2014

(30) Foreign Application Priority Data

Nov. 7, 2012  (JP) .................................. 2012-245629
Apr. 26, 2013  (JP) .................................. 2013-093641

(51) Int. Cl.
| | |
|---|---|
| B25G 3/34 | (2006.01) |
| F16B 11/00 | (2006.01) |
| F16B 12/04 | (2006.01) |
| F16L 13/00 | (2006.01) |
| B23K 1/14 | (2006.01) |
| B23K 1/00 | (2006.01) |
| B23K 1/08 | (2006.01) |
| B23K 1/19 | (2006.01) |

(Continued)

(52) U.S. Cl.
CPC ................ *B23K 1/14* (2013.01); *B23K 1/0016* (2013.01); *B23K 1/08* (2013.01); *B23K 1/19* (2013.01); *B23K 1/20* (2013.01); *B23K 1/203* (2013.01); *B23K 3/0661* (2013.01); *B23K 3/0669* (2013.01); *B23K 2201/32* (2013.01); *B23K 2201/34* (2013.01); *B23K 2201/38* (2013.01); *B23K 2203/10* (2013.01); *B23K 2203/12* (2013.01); *B23K 2203/18* (2013.01); *Y10T 403/479* (2015.01)

(58) Field of Classification Search
CPC .......... B23K 1/0016; B23K 1/08; B23K 1/14; B23K 1/19; B23K 1/20; B23K 3/0661; B23K 3/0669; B23K 2201/32; B23K 2201/34; B23K 2201/38; B23K 2203/10; B23K 2203/12; B23K 2203/18; Y10T 403/477; Y10T 403/478; Y10T 403/479
USPC .................................................. 403/270–272
See application file for complete search history.

(56) References Cited

U.S. PATENT DOCUMENTS

| | | | | | |
|---|---|---|---|---|---|
| 2,680,236 | A | * | 6/1954 | Kuebler | .......................... 439/617 |
| 3,181,226 | A | * | 5/1965 | Bram | ............................. 438/537 |
| 3,536,243 | A | * | 10/1970 | Higgins | .......................... 228/37 |

(Continued)

FOREIGN PATENT DOCUMENTS

| | | | |
|---|---|---|---|
| JP | 05304029 | A * | 11/1993 |
| JP | 2008-148533 | A | 6/2008 |
| JP | 2011-222406 | A | 11/2011 |

*Primary Examiner* — Gregory Binda
*Assistant Examiner* — Nahid Amiri
(74) *Attorney, Agent, or Firm* — Keating & Bennett, LLP

(57) ABSTRACT

A solder joint structure includes a metal pin in the shape of a prism or a circular or substantially circular cylinder; an aluminum wire including a wound portion wound around the metal pin; and a solder layer arranged to join the metal pin and at least one portion of the wound portion to each other. The at least one portion of the wound portion includes a deformed surface resulting from a partial disappearance or elimination of the aluminum wire in a cross-section perpendicular or substantially perpendicular to a direction in which the aluminum wire extends, and the solder layer is directly and closely adhered to the deformed surface.

23 Claims, 21 Drawing Sheets

(51) Int. Cl.
  *B23K 1/20* (2006.01)
  *B23K 3/06* (2006.01)

(56) References Cited

U.S. PATENT DOCUMENTS

| | | | | |
|---|---|---|---|---|
| 3,752,381 A | * | 8/1973 | Watson, Jr. | 228/56.2 |
| 3,833,163 A | * | 9/1974 | Denslow et al. | 228/56.2 |
| 3,920,176 A | * | 11/1975 | Becker et al. | 228/183 |
| 4,849,151 A | * | 7/1989 | Tamura et al. | 264/294 |
| 5,476,211 A | * | 12/1995 | Khandros | 228/180.5 |
| 6,727,579 B1 | * | 4/2004 | Eldridge et al. | 257/692 |
| 7,644,495 B2 | * | 1/2010 | Aisenbrey | 29/843 |
| 2002/0092898 A1 | * | 7/2002 | Proksch et al. | 228/256 |
| 2011/0175525 A1 | * | 7/2011 | Hoene et al. | 313/623 |

* cited by examiner

SOLDER JOINT STRUCTURE AND SOLDER JOINING METHOD

BACKGROUND OF THE INVENTION

1. Field of the Invention

The present invention relates to a solder joint structure and a solder joining method.

2. Description of the Related Art

Soldering is often used for joining a conducting wire made of copper. JP-A 2008-148533 describes a technique of using a copper-coated aluminum wire to solder a conducting wire whose main portion is made of aluminum with a condition similar to that in the case where soldering of a conventional conducting wire made of copper is carried out. In addition, soldering of a conducting wire made of aluminum has been attempted. JP-A 2011-222406 discloses a technique regarding an aluminum-coated electric wire in which a core wire made up of a plurality of aluminum element wires stranded together is coated with an insulating coating. This technique enables a solder to penetrate into the core wire. According to the technique, a portion of the insulating coating is removed from one end of the aluminum-coated electric wire to expose a portion of the core wire thereat, the end of the aluminum-coated electric wire is immersed in a molten solder, and ultrasonic vibrations are applied to the molten solder. In addition, an air inside the insulating coating of the aluminum-coated electric wire is sucked through another end of the aluminum-coated electric wire.

As a method of joining two conducting wires to each other in wiring for an electrical appliance, such as a motor, the following method is sometimes adopted. That is, one of the conducting wires is once joined to a metal pin or the like, and then the other conducting wire is joined to the same metal pin. In the case where this method is adopted, conducting wires made of copper have been used so far. The present inventor attempted to use an aluminum wire as one of the above conducting wires in the above joint structure. JP-A 2011-222406, however, only discloses the technique for enabling the solder to penetrate into the core wire, i.e., a stranded wire, and does not disclose a technique for joining the aluminum wire to the metal pin. Accordingly, the present inventor needed to independently research and develop a joint structure and a joining method to be used when the aluminum wire is joined to the metal pin.

SUMMARY OF THE INVENTION

Preferred embodiments of the present invention firmly join a metal pin and an aluminum wire to each other.

A solder joint structure according to a preferred embodiment of the present invention includes a metal pin in a shape of a prism or a circular cylinder; an aluminum wire including a wound portion wound around the metal pin; and a solder layer arranged to join the metal pin and at least one portion of the wound portion to each other. The at least one portion of the wound portion includes a deformed surface resulting from a partial elimination of the aluminum wire in a cross-section perpendicular or substantially perpendicular to a direction in which the aluminum wire extends, and the solder layer is directly and closely adhered to the deformed surface.

The solder joint structure according to a preferred embodiment of the present invention enables the metal pin and the aluminum wire to be firmly joined to each other.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

It is assumed herein that a vertical direction is defined as a direction in which a central axis of a motor extends, and that an upper side and a lower side along the central axis of the motor are referred to simply as an upper side and a lower side, respectively. It should be noted, however, that the above definitions of the vertical direction and the upper and lower sides are not meant to indicate relative positions or directions of different members or portions when they are actually installed in a device. Also note that directions parallel to or substantially parallel to the central axis are referred to by the term "axial direction", "axial", or "axially", that radial directions centered on the central axis are simply referred to by the term "radial direction", "radial", or "radially", and that a circumferential direction about the central axis is simply referred to by the term "circumferential direction", "circumferential", or "circumferentially".

Figure 1:
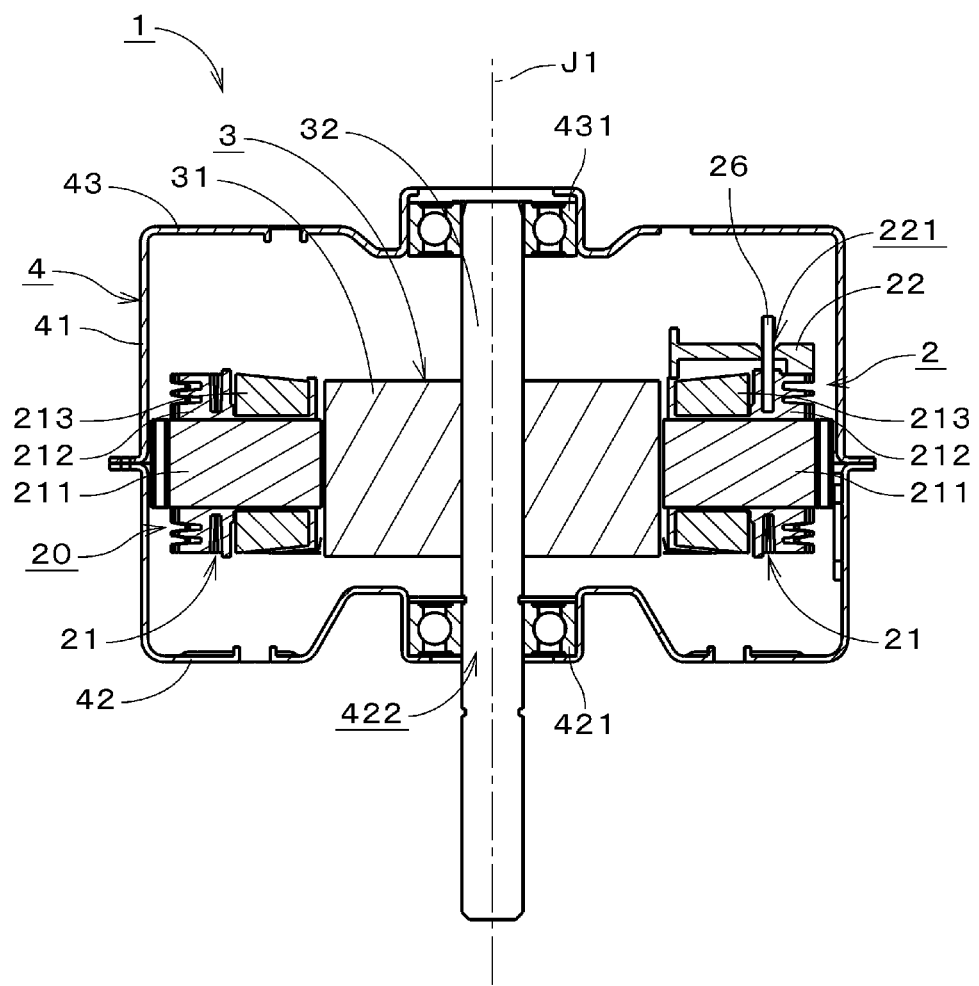
FIG. 1 is a cross-sectional view of a motor according to a preferred embodiment of the present invention.

FIG. 1 is a vertical cross-sectional view of a motor 1 according to a preferred embodiment of the present invention. The motor 1 is preferably an induction motor. The motor 1 preferably includes a stationary portion 2, which is a stationary assembly, a rotating portion 3, which is a rotating assembly, and a housing 4. The rotating portion 3 includes a rotating portion body 31, which is preferably, for example, a squirrel-cage rotor, and a shaft 32. The shaft 32 is press fitted and thus fixed in a hole portion defined in the rotating portion body 31, and is arranged to extend in a vertical direction along a central axis J1 of the motor 1. A central axis of the shaft 32 coincides with the central axis J1.

The housing 4 preferably includes a cylindrical or substantially cylindrical tubular portion 41 arranged to surround the central axis J1, a lower portion 42 arranged to close a lower opening of the tubular portion 41, and an upper portion 43 arranged to close an upper opening of the tubular portion 41. An opening 422 through which the shaft 32 is inserted is preferably defined in a center of the lower portion 42. A lower bearing portion 421 is arranged around the opening 422 of the lower portion 42. An upper bearing portion 431 is arranged around the central axis J1 on the upper portion 43. The upper and lower bearing portions 431 and 421 are arranged to rotatably support the shaft 32 of the rotating portion 3.

The stationary portion 2 preferably includes an annular stator 20 arranged opposite to an outer circumferential surface of the rotating portion body 31. An outer circumferential portion of the stator 20 is fixed to an inner circumferential surface of the tubular portion 41 of the housing 4. A central axis of the stator 20 coincides with the central axis J1. The stator 20 includes a plurality of coil portions 21. The coil portions 21 are arranged along a circumferential direction around the rotating portion body 31. Each coil portion preferably includes a core portion 211 made of a magnetic material, such as, for example, iron, an insulator 212 made of an insulating material, such as, for example, a resin, and a coil 213. The core portion 211 is arranged to extend in a radial direction, and a tip of the core portion 211 is arranged opposite to the rotating portion body 31. The insulator 212 includes a bobbin arranged to cover side surfaces of the core portion 211, the side surfaces extending along the radial direction. The coil 213 is preferably defined by an aluminum wire wound around the core portion 211 to define multiple layers with the insulator 212 intervening therebetween.

Figure 2:
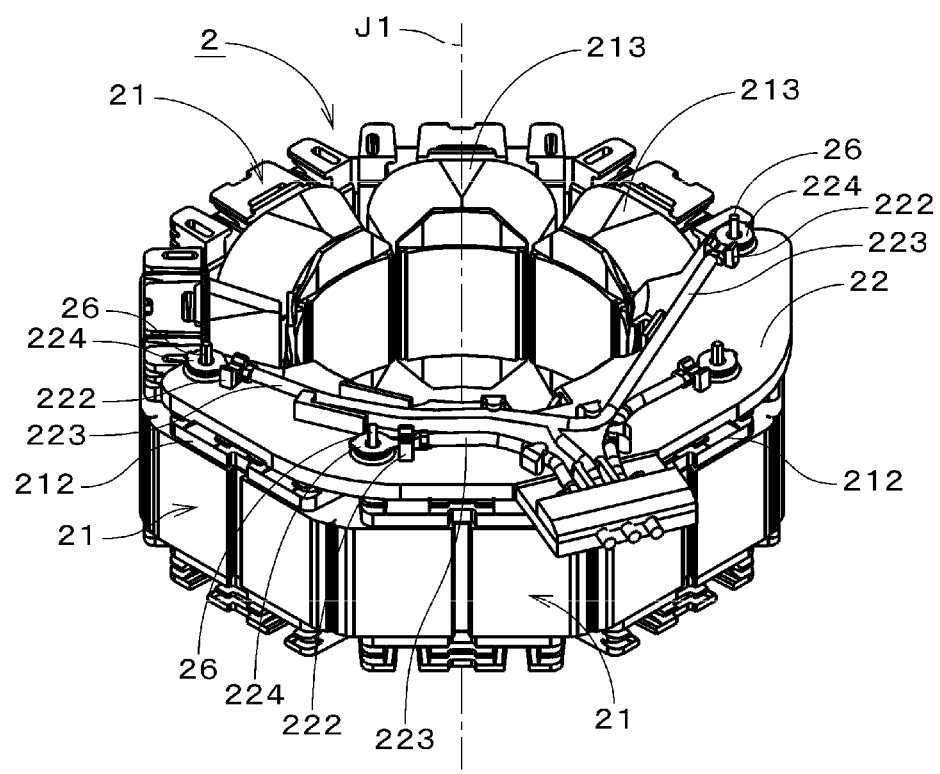
FIG. 2 is a perspective view of a stationary portion according to a preferred embodiment of the present invention.

FIG. 2 is a perspective view illustrating the internal structure of the motor 1. In FIG. 2, only the stationary portion 2 is shown. The stationary portion 2 preferably further includes an adapter 22. The adapter 22 is arranged on upper surfaces of the insulators 212 of some of the coil portions 21. Each of these coil portions 21 preferably includes a metal pin 26 arranged to project above the upper surface of the insulator 212 thereof. Referring to FIG. 1, the adapter 22 preferably includes insert holes 221 through which the metal pins 26 are inserted. Each metal pin 26 is preferably in the shape of a prism, e.g., a quadrangular prism. Note that each metal pin 26 may alternatively be in the shape of a circular cylinder if so desired. An upper end of each metal pin 26 is arranged to reach a space above the adapter 22. The metal pin 26 is preferably, for example, made of phosphor bronze and plated with tin.

The stationary portion 2 illustrated in FIG. 2 preferably includes four of such metal pins 26. The number of coil portions 21 arranged in the circumferential direction preferably is eight, for example, and the coils 213 of four alternate ones of the eight coil portions 21 are defined by a single aluminum wire. Both end portions of this aluminum wire are connected to two of the metal pins 26 separately. The coils 213 of the remaining four alternate coil portions 21 are also defined by a single aluminum wire. Both end portions of this aluminum wire are connected to the remaining two metal pins 26 separately. Note that the number of coil portions 21 may not necessarily be eight, and that the number of metal pins 26 may not necessarily be four, such that any desirable number of coil portions 21 and metal pins 26 could be used.

The adapter 22 preferably includes lead wire fixing portions 222 arranged to fix lead wires 223. Annular terminals 224 made of a metal, such as, for example, copper, are arranged at ends of the lead wires 223. The annular terminals 224 are soldered to the metal pins 26, and are thus connected to the metal pins 26. Other ends of the lead wires 223 are connected to an external power supply (not shown). Drive currents are supplied from the external power supply to the coil portions 21 through the lead wires 223 and the metal pins 26, so that the rotating portion 3 (illustrated in FIG. 1) is caused to rotate about the central axis J1.

Figure 3:
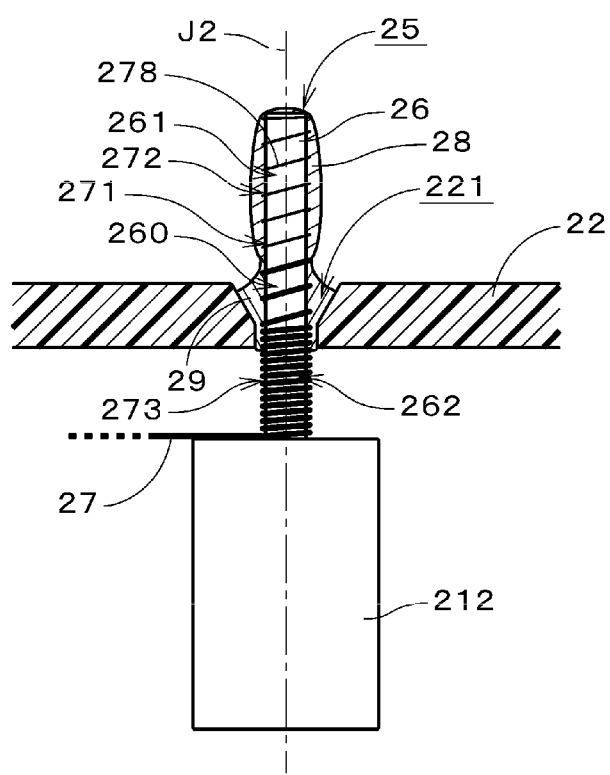
FIG. 3 is a cross-sectional view of a solder joint structure according to a preferred embodiment of the present invention.

FIG. 3 is a cross-sectional view of the adapter 22, illustrating a section of the adapter 22 taken along a plane including a central axis J2 of one of the metal pins 26. In FIG. 3, the insulator 212 is illustrated in a simplified form as a rectangle, and the lead wire 223 and the annular terminal 224 are not shown. An aluminum wire 27 defining the coil 213 preferably includes a wound portion 271 wound around the metal pin 26 along the central axis J2 of the metal pin 26. The aluminum wire 27 is arranged to have a diameter smaller than the thickness of the metal pin 26. A cross-section of the metal pin 26 may preferably be, for example, either circular or square. Here, the thickness of the metal pin 26 refers to the maximum width of the metal pin 26 in a cross-section perpendicular or substantially perpendicular to the central axis J2.

The wound portion 271 is a portion of the aluminum wire 27 which is wound around the metal pin 26. The wound portion 271 preferably includes a sparsely wound portion 272 arranged at a tip portion 261 and an intermediate portion 260 of the metal pin 26, and a densely wound portion 273 arranged at a base portion 262 of the metal pin 26. One end of the metal pin 26 is buried under the surface of the insulator 212 made of the resin. That is, the densely wound portion 273 is located closer to the surface of the insulator 212 than the sparsely wound portion 272.

The sparsely wound portion 272 of the aluminum wire 27 is wound around the metal pin 26 such that adjacent turns thereof are spaced from each other by a gap greater than the diameter of the aluminum wire 27. The gap between the adjacent turns of the sparsely wound portion 272 of the aluminum wire 27 is preferably, for example, arranged to be greater than the diameter of the aluminum wire 27 and equal to or smaller than about ten times the diameter of the aluminum wire 27. The densely wound portion 273 of the aluminum wire 27 is wound around the metal pin 26 such that a pitch thereof is equal to or smaller than twice the diameter of the aluminum wire 27. Therefore, the densely wound portion 273 of the aluminum wire 27 is wound around the metal pin 26 such that adjacent turns thereof are in contact with each other without a gap therebetween or spaced from each other by a gap equal to or smaller than the diameter of the aluminum wire 27. The densely wound portion 273 of the aluminum wire 27 illustrated in FIG. 3 is wound around the metal pin 26 with almost no gap between the adjacent turns thereof. Note that the term "pitch" as used herein refers to the distance between centers of adjacent turns of the aluminum wire 27.

Turns of the densely wound portion 273 of the aluminum wire 27 may be arranged to overlap with one another in a radial direction of the metal pin 26. In other words, the pitch of the densely wound portion 273 of the aluminum wire 27 measured in an axial direction of the metal pin 26 may be smaller than the diameter of the aluminum wire 27. Overlapping of turns of the densely wound portion 273 of the aluminum wire 27 contributes to securely fixing the densely wound portion 273 of the aluminum wire 27 to the metal pin 26.

The aluminum wire 27 is coated with an insulating coating except at both end portions thereof. Note that each end portion of the aluminum wire 27 may be uncoated with the insulating coating either entirely or partially. In FIG. 3, a portion of the aluminum wire 27 which is coated with the insulating coating is represented by a thick line, while a portion 278 of the aluminum wire 27 which is not coated with the insulating coating is represented by a thin line. The portion 278 of the aluminum wire 27 which is not coated with the insulating coating will be hereinafter referred to as an "uncoated portion" 278. For example, at least one portion of the sparsely wound portion 272 or the entire sparsely wound portion 272 is preferably the uncoated portion 278. At least one portion of the sparsely wound portion 272 and at least one portion of a portion of the metal pin 26 around which the sparsely wound portion 272 is wound are coated with a solder layer 28. As described below, the solder layer 28 is preferably defined by, for example, soldering with the application of ultrasonic waves. The metal pin 26 and the wound portion 271 are joined to each other by the solder layer 28. A solder joint structure 25 including the metal pin 26, the aluminum wire 27, and the solder layer 28 is defined with the metal pin 26, the aluminum wire 27, and the solder layer 28 as main components thereof. In the solder joint structure 25 illustrated in FIG. 3, no portion of the solder layer 28 is arranged on the densely wound portion 273.

As described above, the metal pin 26 is inserted through a corresponding one of the insert holes 221 of the adapter 22. Both the tip portion 261 of the metal pin 26 and the solder layer 28 are arranged above the insert hole 221. That is, at least one portion of the portion of the metal pin 26 around which the sparsely wound portion 272 is wound is accommodated in the insert hole 221. The diameter of the insert hole 221 is arranged to gradually increase with increasing height near an upper surface of the adapter 22. A resin 29 is preferably arranged in the insert hole 221. In addition, circumferences of portions of the wound portion 271 and the metal pin 26 which extend between the insert hole 221 and the tip portion 261, that is, circumferences of portions of the wound portion 271 and the metal pin 26 which extend between the insert hole 221 and the solder layer 28, are covered with the resin 29.

Figure 4:
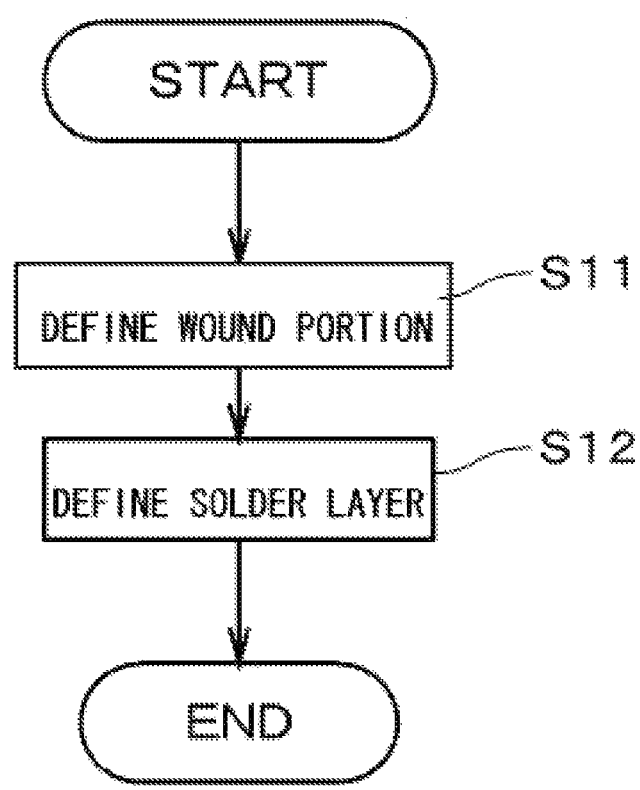
FIG. 4 is a flowchart illustrating a flow of a solder joining process according to a preferred embodiment of the present invention.
Figure 5:
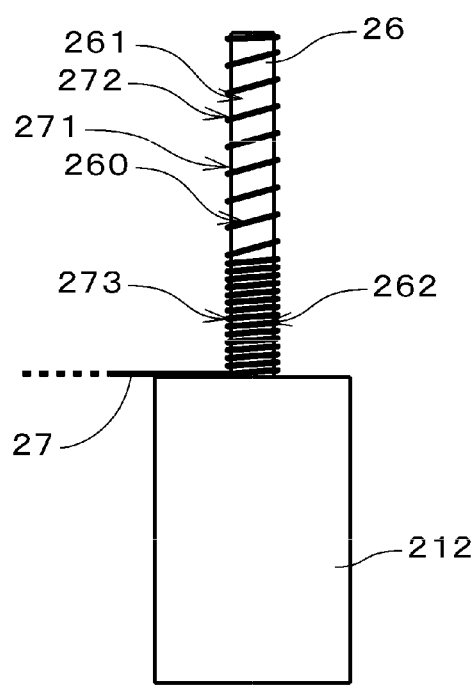
FIG. 5 is a diagram illustrating a metal pin with a wound portion wound therearound according to a preferred embodiment of the present invention.

FIG. 4 is a flowchart illustrating a flow of a solder joining process of forming the solder joint structure 25 illustrated in FIG. 3. Referring to FIG. 5, in the solder joining process, the aluminum wire 27 is first wound around the metal pin 26 provided on the insulator 212 to define the wound portion 271 (step S11). As to the solder joint structures 25 used in the stationary portion 2 illustrated in FIG. 1, both end portions of each of the aluminum wires 27 which define the plurality of coils 213 are wound around two of the metal pins 26 separately. At this time, at the base portion 262 of each metal pin 26 as illustrated in FIG. 5, the aluminum wire 27 is densely wound to define the densely wound portion 273. Meanwhile, at the tip portion 261 and the intermediate portion 260 of each metal pin 26, the aluminum wire 27 is sparsely wound to define the sparsely wound portion 272.

Figure 6:
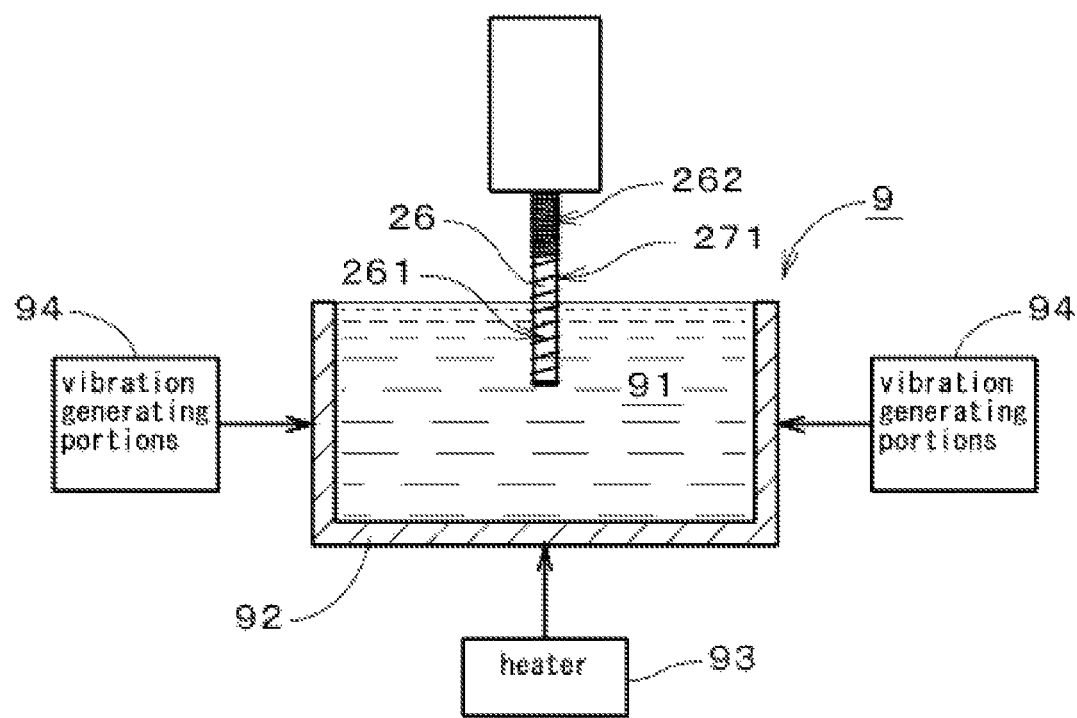
FIG. 6 is a diagram illustrating a soldering apparatus according to a preferred embodiment of the present invention.

FIG. 6 is a diagram illustrating a soldering apparatus 9 used to carry out the soldering. The soldering apparatus 9 preferably includes a treatment bath 92, a heater 93, and vibration generating portions 94. The treatment bath 92 is used to store a molten solder 91. The heater 93 is used to heat the treatment bath 92 to maintain a molten state of the molten solder 91 in the treatment bath 92. Each vibration generating portion 94 is used to apply the ultrasonic waves to the treatment bath 92.

The molten solder 91 is preferably a so-called lead-free solder, containing tin (Sn), silver (Ag), and copper (Cu), for example, and not containing lead (Pb). Preferably, the molten solder 91 is a tin-silver eutectic in composition or is similar in composition. Specifically, the molten solder 91 preferably contains about 1.5% to about 4.0% silver by weight, for example. The molten solder 91 preferably is, for example, an Sn-3.0Ag-0.5Cu solder. This solder preferably has a silver content of about 3.0% by weight and a copper content of about 0.5% by weight, for example.

The tip portion 261 of the metal pin 26 is immersed in the molten solder 91 stored in the treatment bath 92. At this time, a portion of the insulating coating on the aluminum wire 27 around the tip portion 261 is removed by the molten solder 91 having a high temperature. In addition, the ultrasonic waves are applied to the molten solder 91 by the vibration generating portions 94. The metal pin 26 is thereafter drawn up out of the treatment bath 92. The molten solder 91 adhered to the tip portion 261 and a portion of the aluminum wire 27 around the tip portion 261 is naturally cooled and solidified. As a result of the above-described soldering with the application of the ultrasonic waves, the solder layer 28, which is arranged to join a portion of the wound portion 271 to the metal pin 26, is defined as illustrated in FIG. 3 (step S12). Preferably, the silver content of the solder of the solder layer 28 is about 1.5% or greater by weight, for example.

In a process of step S12, an oxide film covering a surface of the aluminum wire 27 in the molten solder 91 is removed by the ultrasonic waves applied by the vibration generating portions 94. As a result, an aluminum surface appears on the surface of the aluminum wire 27, and the molten solder 91 is securely adhered to the surface of the aluminum wire 27. An oxide film on a surface of a portion of the metal pin 26 in the molten solder 91 is also preferably removed in a similar manner. As a result, the solder layer 28 and the metal pin 26 are directly and closely adhered to each other while the solder layer 28 and the aluminum wire 27 are directly and closely adhered to each other. As described above, in the above-described solder joining process, the oxide films on the wound portion 271 and the metal pin 26 are removed to securely join the metal pin 26 and the aluminum wire 27 to each other.

In the above-described solder joining process, the aluminum wire 27 is preferably arranged to have a diameter of about 0.5 mm or less, for example. Moreover, the aluminum wire 27 is preferably arranged to have a diameter of about 0.1 mm or greater, for example, from the viewpoint of handling the aluminum wire 27. The diameter of the aluminum wire 27 may be arbitrarily determined within the above range in accordance with requirements from magnetic circuit design.

Note that, even when the aluminum wire does not have a wire diameter within the above range, the soldering is possible and a solder joint where the aluminum wire, the metal pin, and the solder layer are directly and closely adhered to one another can be obtained although workability is reduced to some degree.

In the solder joint structure 25, a portion of the wound portion 271 which is in the solder layer 28 includes a portion of the sparsely wound portion 272. Thus, the solder is sufficiently adhered to both the aluminum wire 27 and the metal pin 26 so that the metal pin 26 and the aluminum wire 27 can be more securely joined to each other. Moreover, since the wound portion 271 includes the densely wound portion 273, the aluminum wire 27 can be securely fixed to the metal pin 26 at the wound portion 271.

Since only the tip portion 261 of the metal pin 26 is immersed in the molten solder 91 as described above, the solder layer 28 is defined only at the tip portion 261. A portion of the sparsely wound portion 272 and the entire densely wound portion 273, or the entirety or only a portion of the densely wound portion 273, is not brought into contact with the molten solder 91. That is, no portion of the solder layer 28 is arranged at the base portion 262 of the metal pin 26. The insulator 212 is thus easily prevented from experiencing damage because of a heat of the molten solder 91 at the time of the soldering. No flux is used in the above-described soldering, and there is therefore no need to perform a subsequent process of removing a flux. Soldering using a flux may be performed if a subsequent process of removing the flux is performed.

During production of the stationary portion 2, the adapter 22 is arranged on the upper surfaces of the insulators 212, and the metal pins 26 are inserted through the insert holes 221 of the adapter 22. The resin is arranged in each of the insert holes 221, and a circumference of a portion of the wound portion 271 which extends between the insert hole 221 and the tip portion 261 is also covered with the resin. Thus, even if the sparsely wound portion 272 or the densely wound portion 273 includes a portion which is not covered with the solder, this portion is preferably prevented from being corroded by a water drop or the like adhered thereto.

Figure 7:
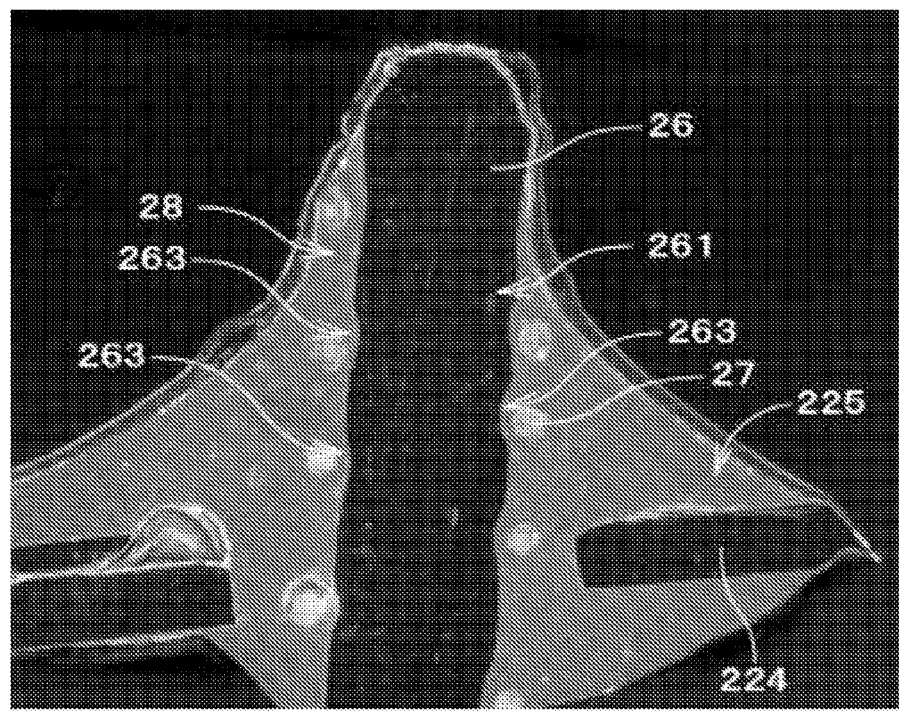
FIG. 7 is an image taken of a section of a tip portion of the metal pin and its vicinity according to a preferred embodiment of the present invention.

In actuality, the tip portion 261 of each metal pin 26 is inserted through the annular terminal 224 at one end of a corresponding one of the lead wires 223 illustrated in FIG. 2 as well. At this time, a solder layer is formed around the annular terminal 224 as well, in a process different from that of the above-described step S12. In FIG. 7 described below, the solder layer around the annular terminal 224 is denoted by reference numeral "225". The type of a solder used to join the metal pin 26 and the lead wire 223 to each other is preferably different from the type of the solder of the solder layer 28 arranged to join the metal pin 26 and the aluminum wire 27 to each other. The solder of the solder layer 28 will be hereinafter referred to as a "first solder", while the solder of the solder layer 225 will be hereinafter referred to as a "second solder". For example, the second solder used to join the metal pin 26 and the lead wire 223 to each other is also a so-called lead-free solder, containing tin, silver, and copper, and not containing lead, but the second solder is preferably different from the first solder of the solder layer 28 in silver content by percentage. The silver content by weight percentage of the second solder is smaller than the silver content by weight percentage of the first solder. Preferably, a solder having a silver content by weight percentage of less than about 1.0%, for example, is used to join the metal pin 26 and the lead wire 223 to each other. More preferably, the second solder is arranged to have a silver content by weight percentage of about 0.5% or less, for example.

As described above, the solder joint structure 25 includes the first solder used in the solder layer 28, and the second solder arranged to join the metal pin 26 and the lead wire 223 to each other. The silver content of the first solder is preferably about 1.5% or greater by weight, while the silver content of the second solder is preferably less than about 1.0% by weight, for example. An improvement in the quality of the solder layer 28 is achieved by using the solder having a relatively high silver content by percentage to join the metal pin 26 and the aluminum wire 27 to each other. Meanwhile, a reduction in the production cost of the motor 1 is achieved by using an inexpensive solder having a lower silver content by percentage than that of the solder of the solder layer 28 to join the metal pin 26 and the lead wire 223 to each other. Use of the solder having a low silver content by percentage to join the metal pin 26 and the lead wire 223 to each other does not cause a problem.

FIG. 7 is an image taken of a section of the tip portion 261 of the metal pin 26 and its vicinity taken along a plane including the central axis J2 of the metal pin 26. As shown in FIG. 7, a surface of the metal pin 26 preferably includes a groove 263 opposed to a portion of the aluminum wire 27 in the solder layer 28. This results in an increase in the area of a region over which the aluminum wire 27 and the metal pin 26 are in proximity to and opposed to each other, compared to the case where the groove 263 is not defined in the metal pin 26. In addition, the solder is preferably provided between the aluminum wire 27 and the metal pin 26 with the solder being directly and closely adhered to both the aluminum wire 27 and the metal pin 26. This results in a reduction in resistance between the aluminum wire 27 and the metal pin 26. An effect of the application of the ultrasonic waves at the time of the soldering may be one cause of the groove 263 being formed.

Figure 8:
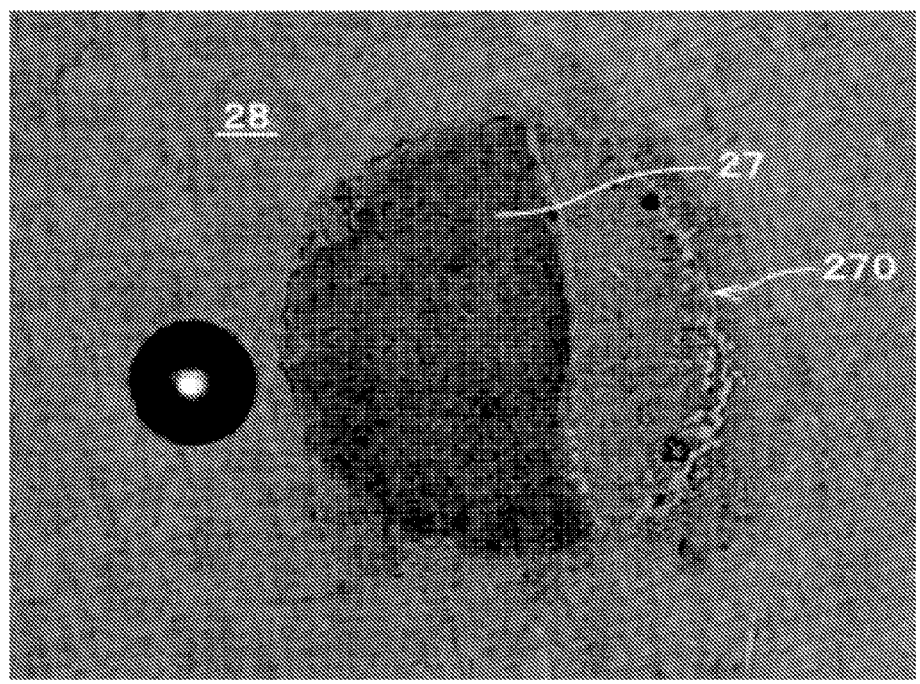
FIG. 8 is an image taken of a cross-section of an aluminum wire in a solder layer according to a preferred embodiment of the present invention.
Figure 9:
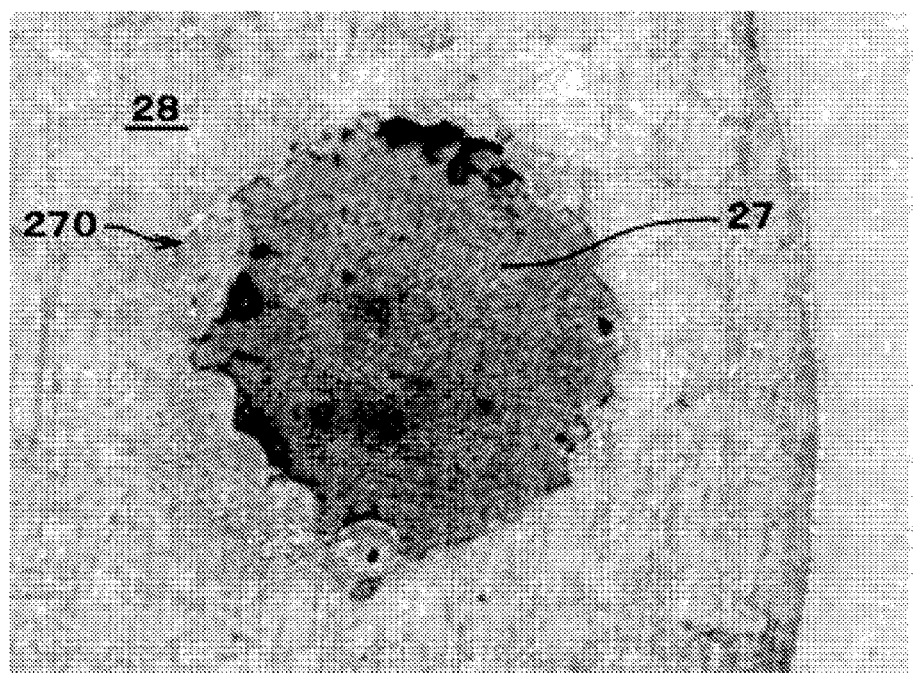
FIG. 9 is an image taken of a cross-section of the aluminum wire in the solder layer according to a preferred embodiment of the present invention.
Figure 10:
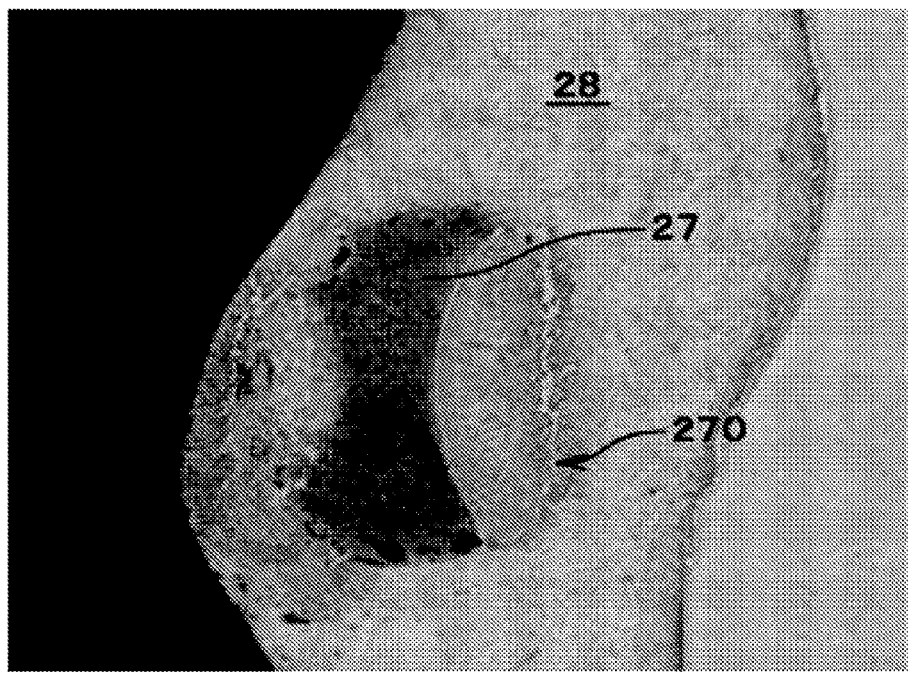
FIG. 10 is an image taken of a cross-section of the aluminum wire in the solder layer according to a preferred embodiment of the present invention.

FIGS. 8, 9, and 10 are each images taken of a cross-section of the aluminum wire 27 in the solder layer 28. As shown in FIGS. 8 to 10, the aluminum wire 27, from the surface of which the oxide film has been removed, is firmly joined to the solder layer 28. In each of FIGS. 8 to 10, the cross-section of the aluminum wire 27 in the solder layer 28 is in the shape of a circle having portions thereof removed from outside. Moreover, a substantially circular vestige 270, which represents the original cross-section of the aluminum wire 27, is discernible. An effect of the application of the ultrasonic waves at the time of the soldering may be one cause of change of the cross-section of the aluminum wire 27 in the solder layer 28 into the shapes as shown in FIGS. 8 to 10.

In the case of the solder joint structure 25 described above, ultrasonic vibrations are applied when a conducting wire made of aluminum, i.e., the aluminum wire 27, is soldered to the metal pin 26, such that improvements in wettability of the solder with respect to the aluminum wire 27 and in reliability of the solder joint are achieved. In addition, a further improvement in the reliability of the solder joint is achieved by adjusting the frequency and intensity of the ultrasonic waves to choose a condition with which the surface of the aluminum wire 27, or both the surface of the aluminum wire 27 and the surface of the metal pin 26, are at least locally shaved by abrasion. Specifically, an improvement in the reliability of the solder joint is achieved by choosing such a condition of the application of the ultrasonic waves that the cross-sectional area of a portion of the wound portion 271 of the aluminum wire 27 which is immersed in the molten solder will be smaller than the cross-sectional area of a portion of the wound portion 271 of the aluminum wire 27 which is not immersed in the molten solder.

A phenomenon of portions of a surface layer and the metal underneath of the aluminum wire 27 disappearing or being eliminated as if being gouged out at step S12 in FIG. 4 is ascribed primarily to abrasion due to friction of the aluminum wire 27 against the metal pin 26 and the solder, but is also ascribed partially to the collapse of the aluminum wire 27 due to vibrations applied from the molten solder, and erosion of the aluminum wire 27 due to the solder.

The choice of the aforementioned condition causes the shape of the cross-section of the aluminum wire 27 to change from the original circle into a shape having a flat or substantially flat or recessed portion. In other words, a cross-section of a surface portion resulting from a partial disappearance or elimination of the aluminum wire 27 has a curvature smaller than that of the original cross-section, or has a curvature which is substantially opposite to that of the original cross-section. Further, the surface of the metal pin 26 may sometimes become locally recessed, particularly at a portion opposed to the aluminum wire 27. This situation is normally unfavorable, because this means that one or both of the aluminum wire 27 and the metal pin 26 have been damaged.

Originally, removing only a thin oxide layer covering the surface of the aluminum wire 27 is enough to secure the wettability. The condition which causes even the metal underneath of the aluminum wire 27 to be gouged out appears to be excessive in view of the purpose of improving the wettability. However, it is difficult to remove the oxide layer on the surface of the aluminum wire 27 with weak ultrasonic vibrations. Accordingly, in the present preferred embodiment, removal of the oxide layer is preferably accomplished by adopting a technique of applying stronger ultrasonic vibrations to cause an oxide of the surface layer to disappear or be eliminated together with the metal underneath. In particular, in the case where an aluminum wire is wound around a pin made of a metal or the like, the pin with the aluminum wire wound therearound is immersed in a solder bath, and ultrasonic vibrations are applied thereto, a portion of a surface of the aluminum wire can be caused to disappear or be eliminated with increased certainty due to the metal pin being in proximity thereto.

In other words, as a result of a large number of experiments, it has been discovered and confirmed that there exist a frequency and an amplitude of the ultrasonic vibrations which are able to cause portions of the surface layer of the aluminum wire 27 and the metal underneath the surface layer to disappear or be eliminated or removed, and this condition is used to accomplish the soldering of the aluminum wire 27 according to the present preferred embodiment.

Note that, even in a case where the aluminum wire 27 is wound around the metal pin 26 and the ultrasonic vibrations are applied thereto, the metal underneath the aluminum wire 27 does not disappear throughout an entire length of the portion of the aluminum wire 27 which is wound around the metal pin 26. The solder may not be sufficiently closely adhered to the aluminum wire 27 where the metal underneath has not disappeared or been removed or eliminated. However, electrical continuity is secured because the aluminum wire 27 is wound around the metal pin 26 multiple times, and an area over which the solder is applied has a sufficient length.

Figure 11:
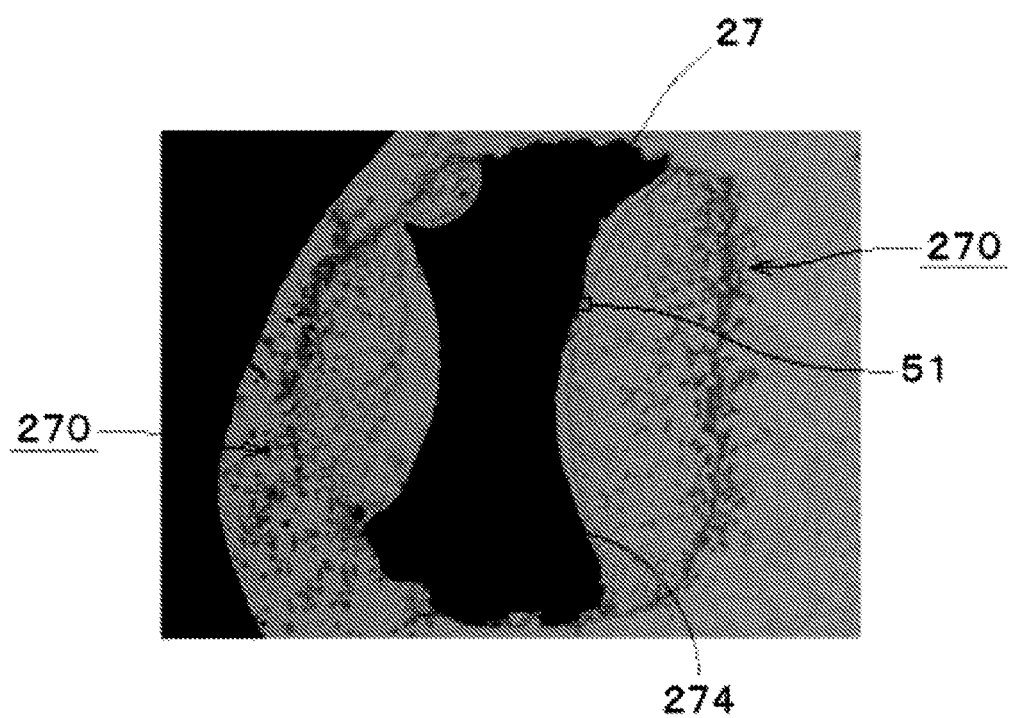
FIG. 11 is an image taken of a cross-section of the aluminum wire in the solder layer according to a preferred embodiment of the present invention.

FIG. 11 is an image taken of the cross-section shown in FIG. 10 using a scanning electron microscope. As mentioned above, the vestige 270, which represents the original contour of the aluminum wire 27, is dimly discernible. Much of the aluminum is distributed along this contour.

Figure 12:
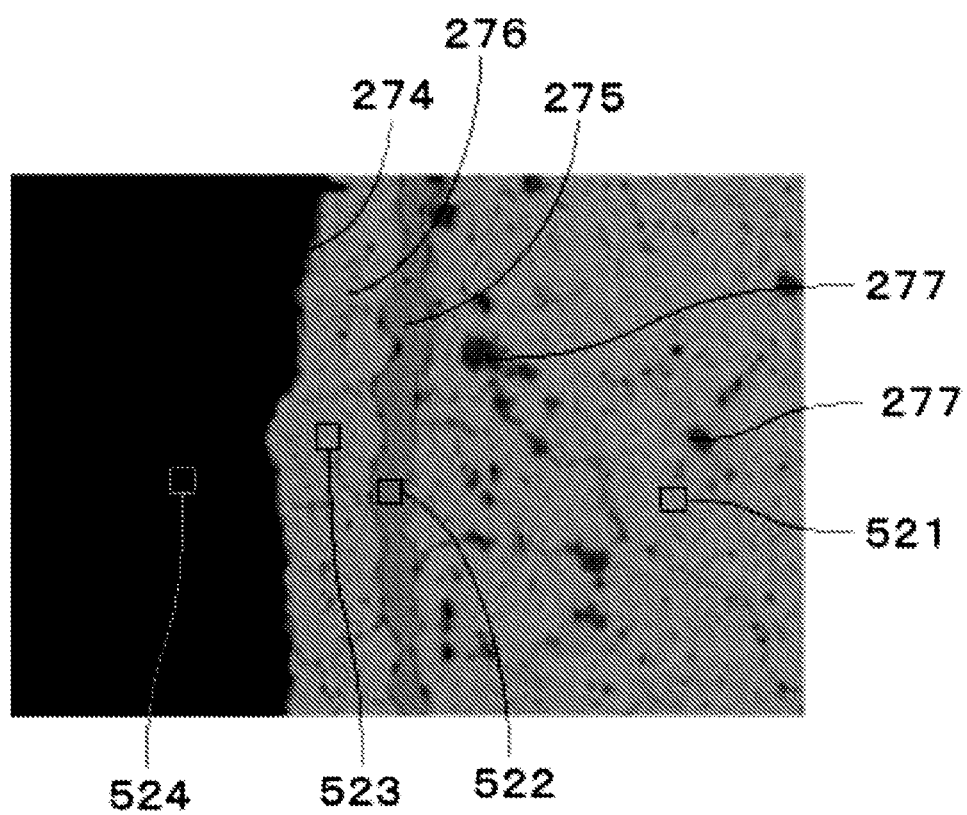
FIG. 12 is an image showing a portion of FIG. 11 in an enlarged form.

FIG. 12 is an image showing an area denoted by reference numeral "51" in FIG. 11 in an enlarged form. An area denoted by reference numeral "521" has an Sn content of about 75%, for example. An area denoted by reference numeral "522" has an Ag content of about 50%, for example. An area denoted by reference numeral "523" has an Sn content of about 75%, for example. An area denoted by reference numeral "524" has an Al content of about 70%, for example. Thus, a layer 275 containing more silver (Ag) than other areas appears at a distance from and along a surface 274 of an area where a portion of the aluminum wire 27 has disappeared or been eliminated or removed. In addition, a layer 276 containing much tin (Sn) appears between the layer 275 and the surface 274. The surface 274 of the aluminum wire 27 which appears as a boundary between the aluminum wire 27 and the area where the portion of the aluminum wire 27 has disappeared or been eliminated or removed will be hereinafter referred to as a "deformed surface". As shown in FIG. 12, a complicated joint structure appears between the solder layer 28 and the aluminum wire 27.

Dark granular areas denoted by reference numeral "277" in FIG. 12 represent aluminum particles. The term "aluminum particles" as used herein refers to particles containing a significant amount of aluminum. In the cross-section of the aluminum wire 27, the aluminum particles, which are represented by dark areas in FIGS. 11 and 12, are arranged between the deformed surface 274 and the original contour of the aluminum wire 27. It is easy to grasp the original contour of the aluminum wire 27 through the shape of a cross-section of another portion of the aluminum wire 27. The external shape of the vestige 270 is considered to substantially coincide with the original contour of the aluminum wire 27. Note that the aluminum particles may not necessarily be provided in an area between the deformed surface 274 and the original contour of the aluminum wire 27.

As mentioned above, the disappearance or elimination of portions of the aluminum wire 27 tends to occur on a side close to the metal pin 26. Therefore, in many cases, the aluminum particles are provided between the deformed surface 274 and the metal pin 26 in the cross-section. The diameter of each aluminum particle is naturally smaller than a maximum distance between the deformed surface 274 and the original contour. The diameters of the aluminum particles are typically in the range of about 0.5 μm to about 10 μm, for example. Bonding of the solder to the aluminum wire 27 is improved with high probability by carrying out the application of the ultrasonic vibrations with a condition which causes dispersion of the aluminum particles in the solder layer 28.

Figure 13:
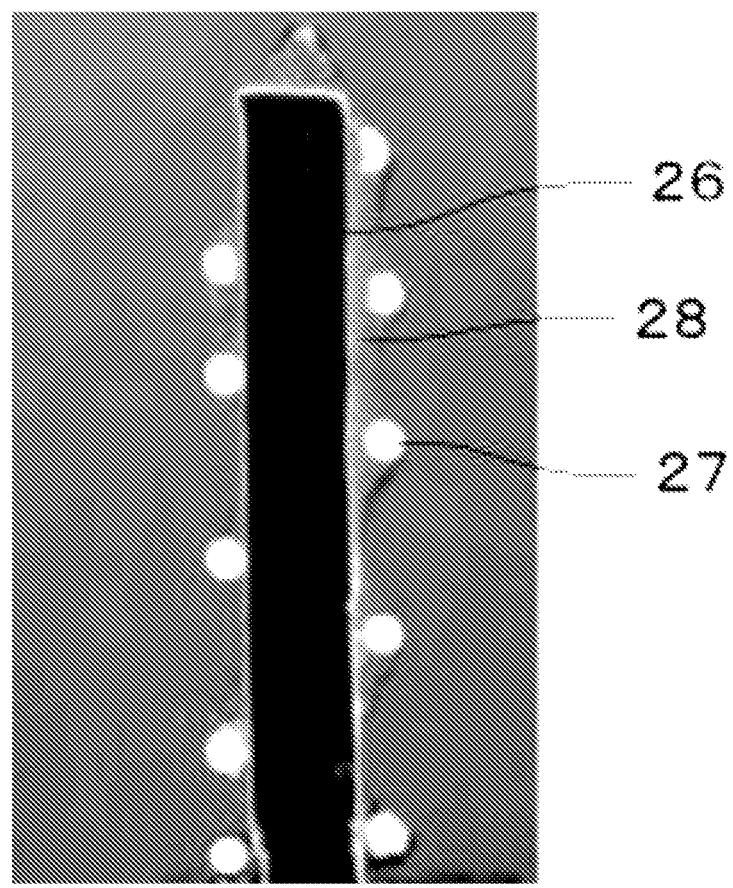
FIG. 13 is an image taken of a section of a tip portion of a metal pin and its vicinity according to a preferred embodiment of the present invention.

FIG. 13 is an image showing a solder joint structure 25 according to a modification of the above-described preferred embodiment. FIG. 13 shows a section of the solder joint structure 25 taken along a plane including a central axis of the metal pin 26. In the modification shown in FIG. 13, the metal pin 26 is preferably made of steel, for example. Before use, the metal pin 26 is preferably, for example, plated with tin to prevent corrosion. In the case where the metal pin 26 is made of steel, preferably no grooves are defined in the surface of the metal pin 26 even if the ultrasonic vibrations are used when the soldering is carried out. On the other hand, portions of the aluminum wire 27 disappear or are eliminated or removed in a manner similar to that shown in FIG. 7. That is, at least one portion of the wound portion 271 includes a deformed surface which results from disappearance or elimination or removal of a portion of the aluminum wire 27 in a cross-section perpendicular or substantially perpendicular to a direction in which the aluminum wire 27 extends.

Figure 14:
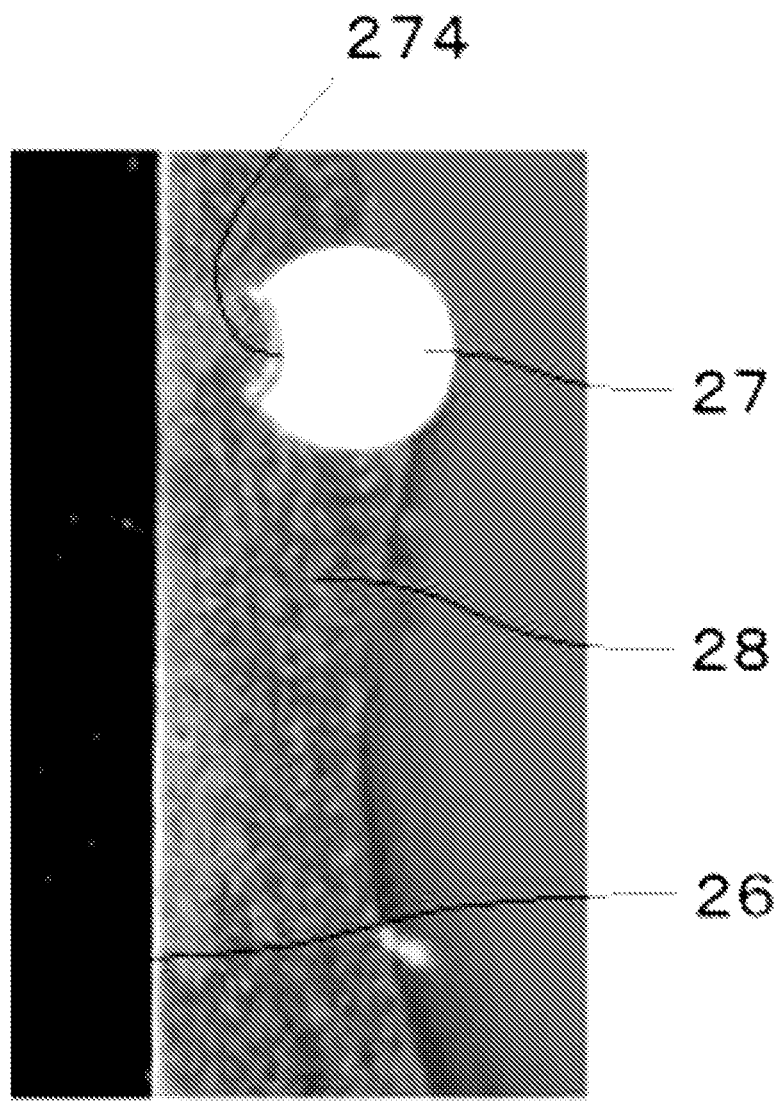
FIG. 14 is an image taken of a cross-section of the aluminum wire in the solder layer according to a preferred embodiment of the present invention.
Figure 15:
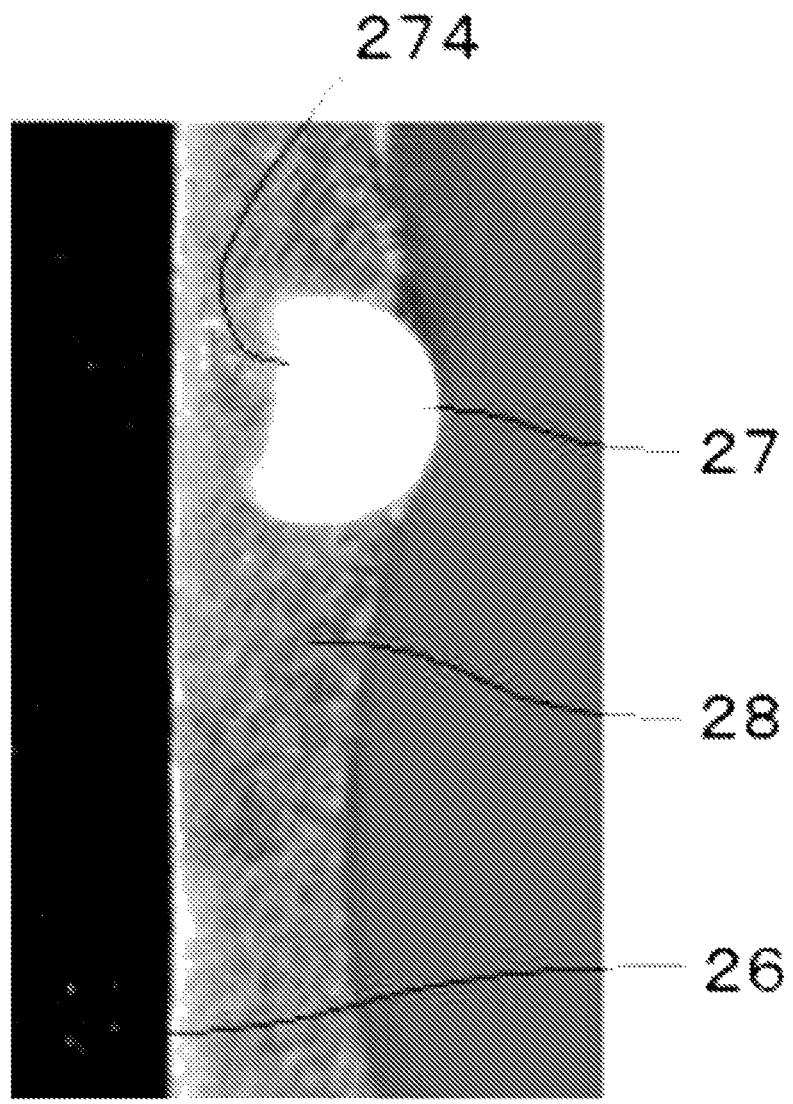
FIG. 15 is an image taken of a cross-section of the aluminum wire in the solder layer according to a preferred embodiment of the present invention.
Figure 16:
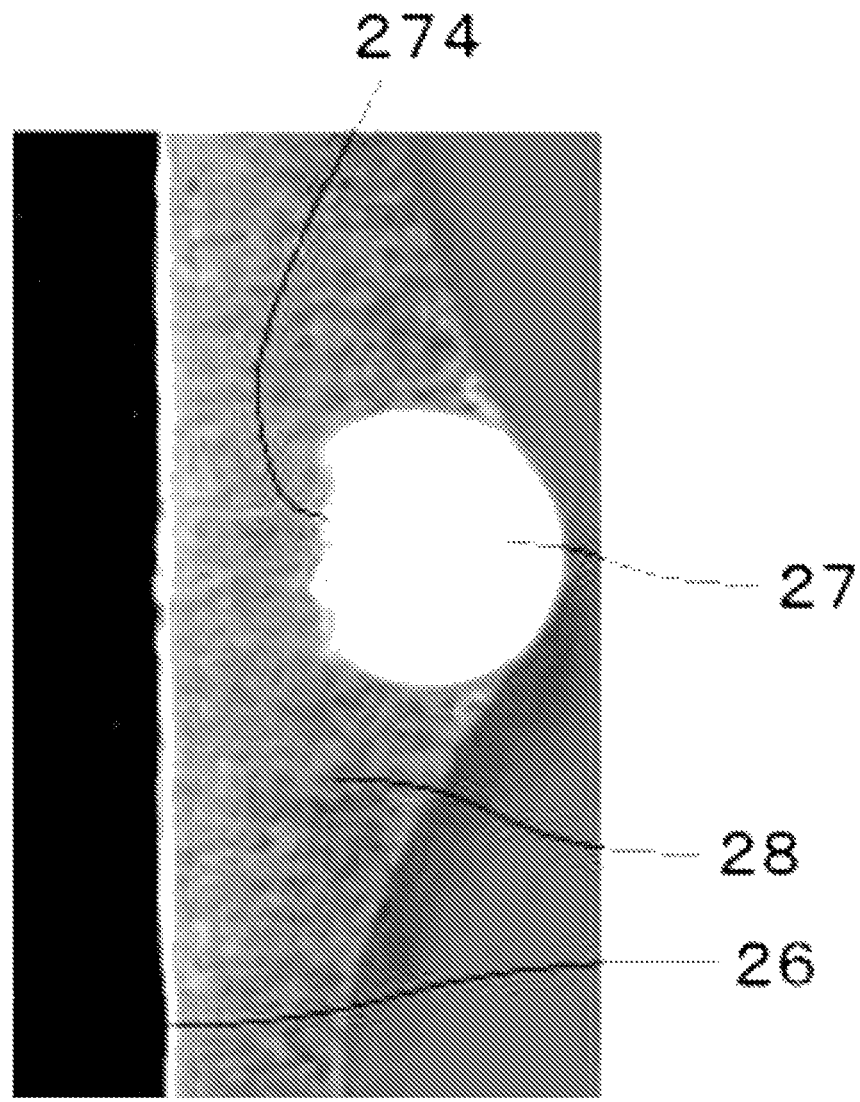
FIG. 16 is an image taken of a cross-section of the aluminum wire in the solder layer according to a preferred embodiment of the present invention.
Figure 17:
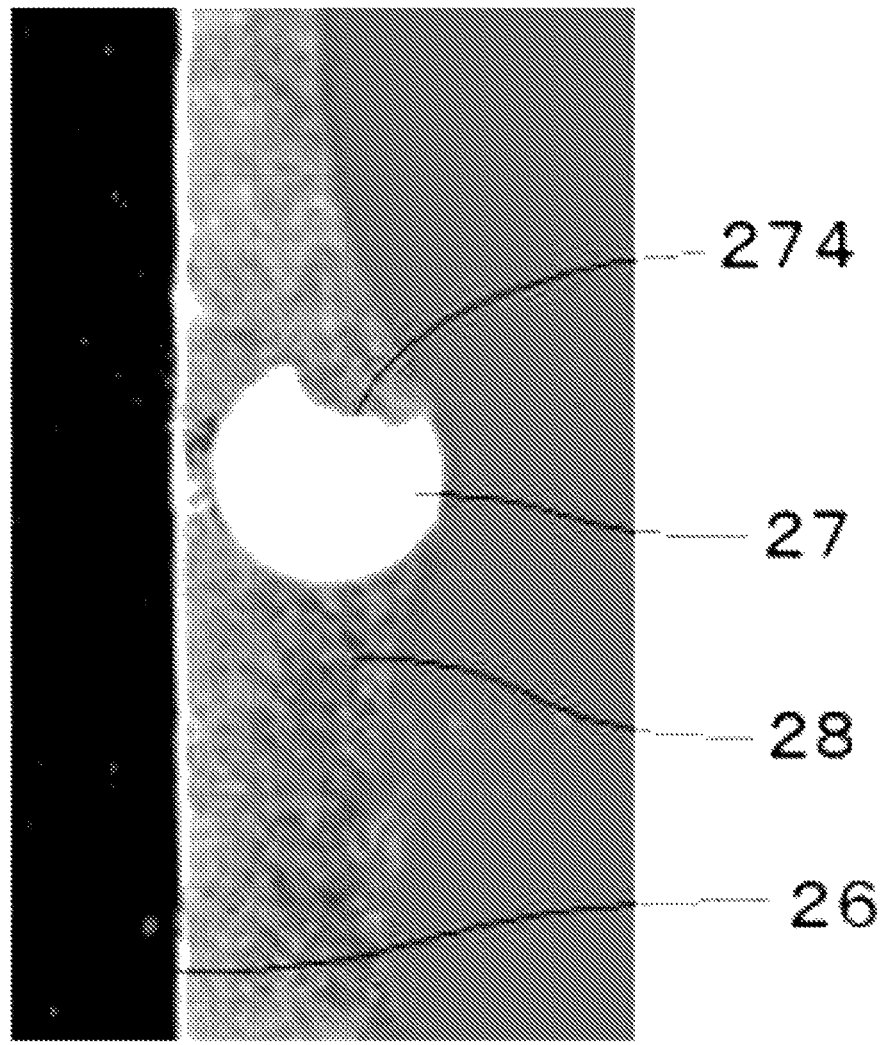
FIG. 17 is an image taken of a cross-section of the aluminum wire in the solder layer according to a preferred embodiment of the present invention.

FIGS. 14, 15, 16, 17, and 18 are each images illustrating the aluminum wire 27, a portion of which has disappeared or been removed or eliminated. As shown in FIGS. 14 to 16, the deformed surface 274 of the aluminum wire 27 tends to appear so as to be opposed to the metal pin 26. Note, however, that the deformed surface 274 may not be opposed to the metal pin 26 as shown in FIG. 17. In addition, as shown in FIGS. 14, 15, and 17, the deformed surface 274 tends to be in the shape of a circular or substantially circular arc, recessed toward an interior of the aluminum wire 27, in a cross-section. Referring to FIG. 16, the deformed surface 274 may not necessarily be in the shape of a circular or substantially circular arc.

Also in each of the above examples, the aluminum particles are arranged between the deformed surface 274 and the original contour of the aluminum wire 27 in the cross-section, although variations occur depending on how the ultrasonic vibrations are applied. Moreover, in the case where the deformed surface 274 is opposed to the metal pin 26, the aluminum particles exist between the deformed surface 274 and the metal pin 26 in the cross-section, although variations occur depending on how the ultrasonic vibrations are applied.

Figure 18:
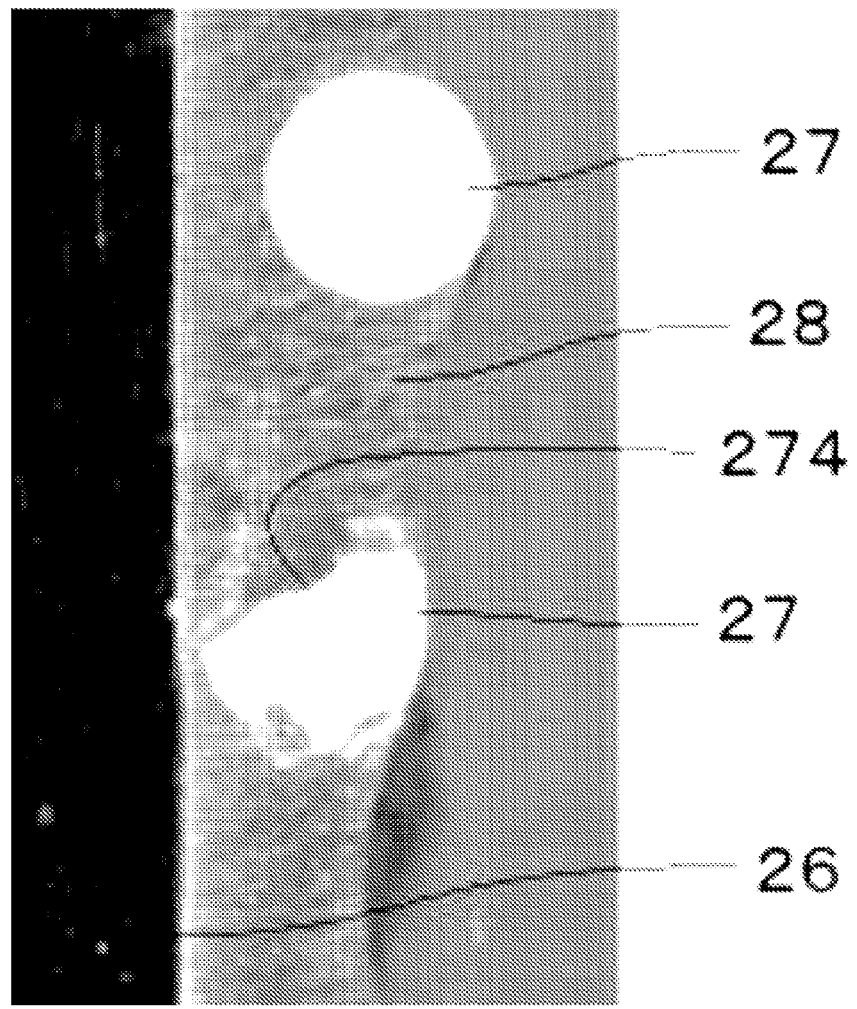
FIG. 18 is an image taken of a cross-section of the aluminum wire in the solder layer according to a preferred embodiment of the present invention.

Referring to an upper portion of FIG. 18, some portions of the aluminum wire 27 do not have any occurrence of disappearance or material removal or elimination. Referring to a lower portion of FIG. 18, a disappearance or material removal or elimination may occur in a complicated manner to cause an irregular deformed surface 274. The fact that the deformed surface 274 often appears in a fan shape suggests that a partial disappearance or elimination of the aluminum wire 27 often starts at a certain starting point in the soldering with the use of the ultrasonic vibrations. Moreover, since partial disappearances or elimination of the aluminum wire 27 tend to occur on the side close to the metal pin 26, proximity of the metal pin 26 is considered to be one cause of the disappearances or eliminations as described above.

Meanwhile, the fact that a disappearance or material elimination or removal sometimes occurs in a collapse-shaped manner and that no disappearance or material elimination or removal occurs at some portions of the aluminum wire 27 as shown in FIGS. 16 and 18 suggests that the soldering with the use of the ultrasonic vibrations tends to easily cause a partial disappearance or elimination or removal of the aluminum wire 27 where the aluminum wire 27 includes a frail portion.

Figure 19:
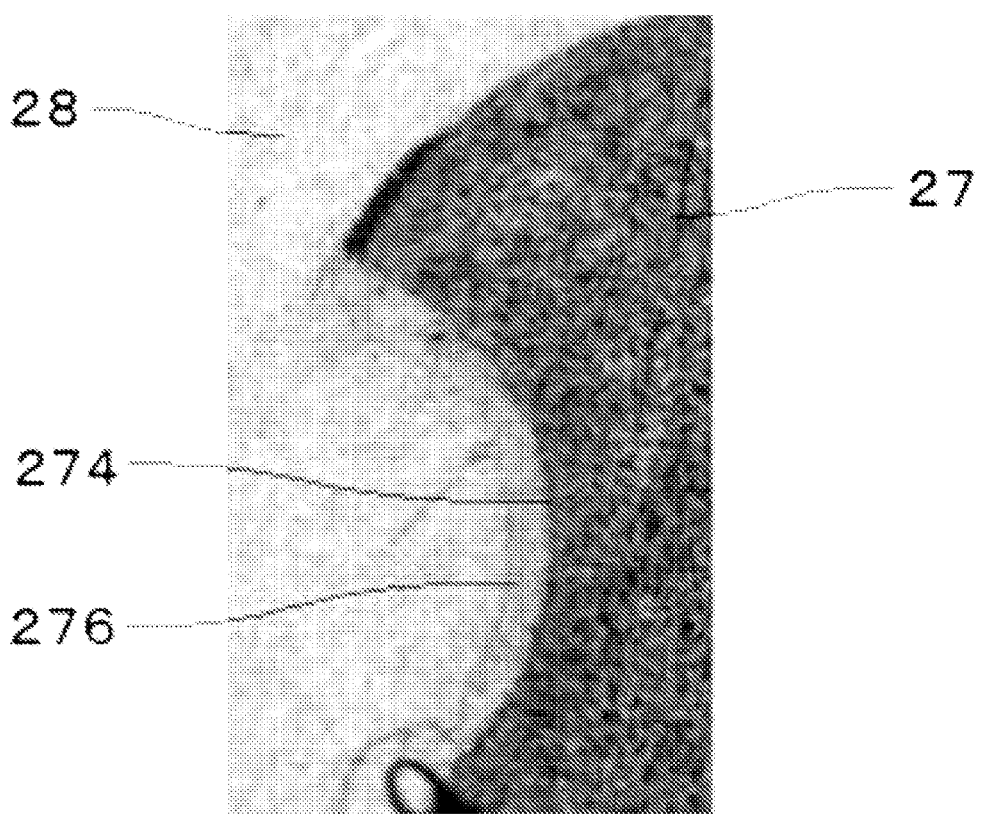
FIG. 19 is an image showing a deformed surface according to a preferred embodiment of the present invention in an enlarged form.
Figure 20:
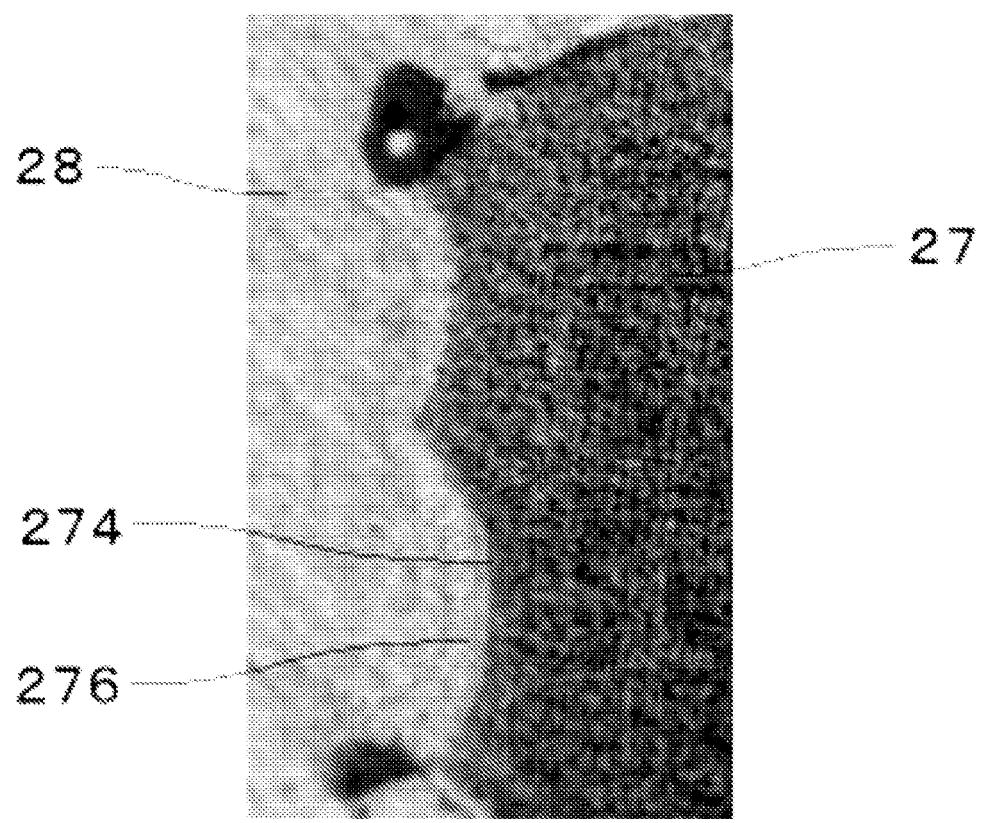
FIG. 20 is an image showing a deformed surface according to a preferred embodiment of the present invention in an enlarged form.
Figure 21:
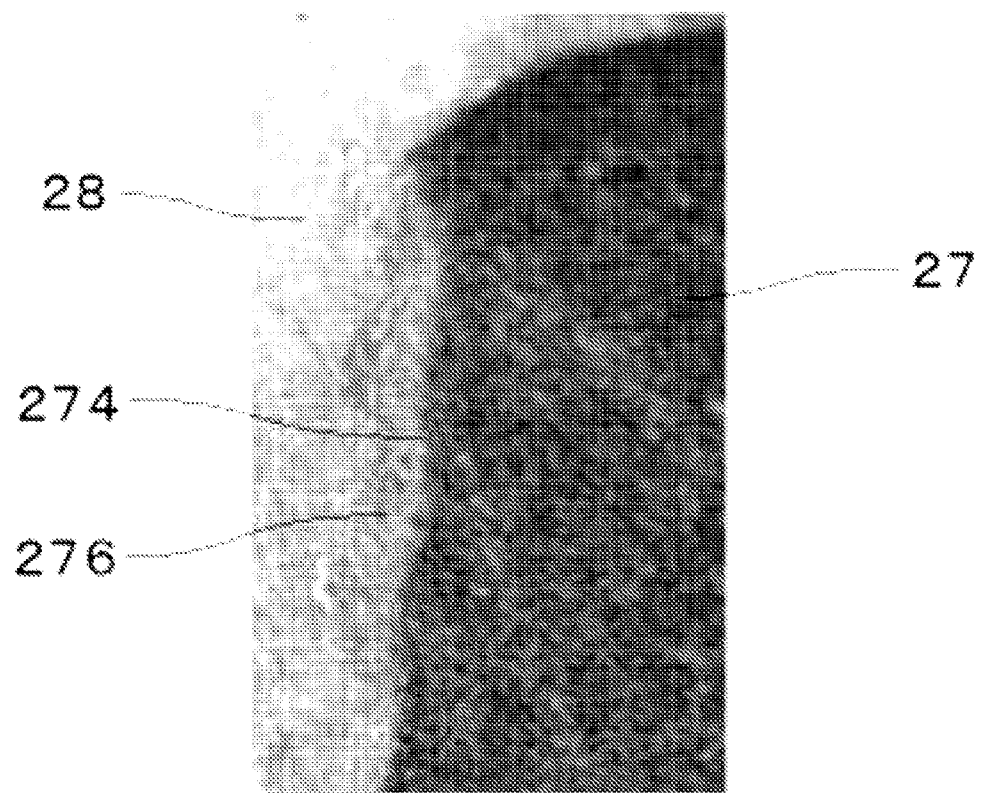
FIG. 21 is an image showing a deformed surface according to a preferred embodiment of the present invention in an enlarged form.

FIGS. 19, 20, and 21 are images showing more examples of the deformed surface 274 in an enlarged form. Both of FIGS. 19 and 20 show an example of the deformed surface 274 having a fan shape, while FIG. 21 shows an example of the deformed surface 274 not having a fan shape. In each example, the layer 276 appears along the deformed surface 274 as in FIG. 12. The layer 276 causes the solder layer 28 and the deformed surface 274 to be directly and closely adhered to each other. Joining of the solder layer 28 and the aluminum wire 27 at the deformed surface 274 enables the solder layer 28 and the aluminum wire 27 to be joined to each other with mechanical and electrical stability.

Regarding the aluminum wire 27, the deformed surface 274 tends to occur on the side close to the metal pin 26. Therefore, the joining with the use of the ultrasonic vibrations as described above is particularly suitable for a structure in which the aluminum wire is bound around the metal pin.

While preferred embodiments of the present invention have been described above, it is to be understood that the present invention is not limited to the above-described preferred embodiments, and that a variety of modifications are possible.

In the solder joint structure 25 illustrated in FIG. 3, the metal pin 26 and a portion of the wound portion 271 are preferably joined to each other through the solder layer 28. Note, however, that the metal pin 26 and the entire wound portion 271 may be joined to each other through the solder layer 28. That is, in a solder joint structure according to a preferred embodiment of the present invention, the metal pin 26 and at least one portion of the wound portion 271 are joined to each other through the solder layer 28. Additionally, the solder may contain lead if so desired.

Also note that the entire wound portion 271 may be composed of the sparsely wound portion or the densely wound portion. Preferably, the at least one portion of the wound portion 271, that is, a portion of the wound portion 271 in the solder layer 28, includes the sparsely wound portion in order to more securely join the metal pin 26 and the aluminum wire 27 to each other.

A variety of pins can be used as the metal pin 26. For example, the metal pin 26 may be a pin made of phosphor bronze whose surface is coated with a hard conductive coating having a Vickers hardness of 400 or more. The hard conductive coating is preferably, for example, an electroless nickel plating, a diamond-like carbide (DLC) coating, or the like. Also in the case where the metal pin 26 is coated with the hard conductive coating, no groove is defined in the metal pin 26 in the soldering with the use of the ultrasonic vibrations.

Also note that the metal pin 26 may be directly fixed to the adapter 22 instead of the insulator 212. In this case, the metal pin 26 is preferably soldered and thus connected to the lead wire 223 fixed to the adapter 22.

Features of the above-described preferred embodiments and the modifications thereof may be combined appropriately as long as no conflict arises.

Preferred embodiments of the present invention are applicable to a variety of motors including solder joint structures. Further, preferred embodiments of the present invention are also applicable to solder joint structures used in devices other than motors.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A solder joint structure comprising:
   a metal pin in a shape of a prism or a circular or substantially circular cylinder;
   an aluminum wire including a wound portion wound around the metal pin; and
   a solder layer arranged to join the metal pin and at least one portion of the wound portion to each other; wherein
   the at least one portion of the wound portion includes a deformed surface resulting from a partial elimination of the aluminum wire in a cross-section perpendicular or substantially perpendicular to a direction in which the aluminum wire extends, and the solder layer is directly adhered to the deformed surface.

2. The solder joint structure according to claim 1, wherein the aluminum wire has a diameter smaller than a thickness of the metal pin.

3. The solder joint structure according to claim 2, wherein, in the cross-section, an aluminum particle is located between the deformed surface and an original contour of the aluminum wire.

4. The solder joint structure according to claim 2, wherein the at least one portion of the wound portion includes a sparsely wound portion wound around the metal pin such that adjacent turns thereof are spaced from each other by a gap having a width greater than a diameter of the aluminum wire.

5. The solder joint structure according to claim 3, wherein the deformed surface is opposed to the metal pin.

6. The solder joint structure according to claim 3, wherein the at least one portion of the wound portion includes a sparsely wound portion wound around the metal pin such that adjacent turns thereof are spaced from each other by a gap having a width greater than a diameter of the aluminum wire.

7. The solder joint structure according to claim 5, wherein, in the cross-section, an aluminum particle is located between the deformed surface and the metal pin.

8. The solder joint structure according to claim 5, wherein the at least one portion of the wound portion includes a sparsely wound portion wound around the metal pin such that adjacent turns thereof are spaced from each other by a gap having a width greater than a diameter of the aluminum wire.

9. The solder joint structure according to claim 7, wherein a surface of the metal pin includes a groove opposed to a portion of the aluminum wire in the solder layer.

10. The solder joint structure according to claim 8, wherein the wound portion includes a densely wound portion wound around the metal pin such that adjacent turns thereof are in contact with each other without a gap therebetween or spaced from each other by a gap having a width equal to or smaller than the diameter of the aluminum wire.

11. The solder joint structure according to claim 10, wherein
the metal pin is arranged to project through a surface of an insulator made of a resin;
the sparsely wound portion is arranged at a tip portion of the metal pin, and the densely wound portion is arranged at a base portion of the metal pin; and
no portion of the solder layer is arranged at the base portion.

12. The solder joint structure according to claim 11, wherein
the metal pin is arranged to project through a surface of an insulator made of a resin;
the insulator includes an adapter arranged on a surface thereof;
the adapter includes:
an insert hole through which the metal pin is inserted; and
a lead wire fixing portion to which a lead wire connected to an external power supply and the metal pin is fixed;
the solder layer is arranged at a tip portion of the metal pin, and no portion of the solder layer is arranged at a base portion of the metal pin; and
the insert hole includes a resin arranged therein, and a circumference of a portion of the wound portion which extends between the insert hole and the tip portion is covered with the resin.

13. The solder joint structure according to claim 1, wherein, in the cross-section, an aluminum particle is located between the deformed surface and an original contour of the aluminum wire.

14. The solder joint structure according to claim 13, wherein the deformed surface is opposed to the metal pin.

15. The solder joint structure according to claim 13, wherein the at least one portion of the wound portion includes a sparsely wound portion wound around the metal pin such that adjacent turns thereof are spaced from each other by a gap having a width greater than a diameter of the aluminum wire.

16. The solder joint structure according to claim 14, wherein, in the cross-section, an aluminum particle is located between the deformed surface and the metal pin.

17. The solder joint structure according to claim 14, wherein the at least one portion of the wound portion includes a sparsely wound portion wound around the metal pin such that adjacent turns thereof are spaced from each other by a gap having a width greater than a diameter of the aluminum wire.

18. The solder joint structure according to claim 1, wherein the at least one portion of the wound portion includes a sparsely wound portion wound around the metal pin such that adjacent turns thereof are spaced from each other by a gap having a width greater than a diameter of the aluminum wire.

19. The solder joint structure according to claim 18, wherein the wound portion includes a densely wound portion wound around the metal pin such that adjacent turns thereof are in contact with each other without a gap therebetween or spaced from each other by a gap having a width equal to or smaller than the diameter of the aluminum wire.

20. The solder joint structure according to claim 19, wherein
the metal pin is arranged to project through a surface of an insulator made of a resin;
the sparsely wound portion is arranged at a tip portion of the metal pin, and the densely wound portion is arranged at a base portion of the metal pin; and
no portion of the solder layer is arranged at the base portion.

21. The solder joint structure according to claim 1, wherein
the metal pin is arranged to project through a surface of an insulator made of a resin;
the insulator includes an adapter arranged on a surface thereof;
the adapter includes:
an insert hole through which the metal pin is inserted; and
a lead wire fixing portion to which a lead wire connected to an external power supply and the metal pin is fixed;
the solder layer is arranged at a tip portion of the metal pin, and no portion of the solder layer is arranged at a base portion of the metal pin; and
the insert hole includes a resin arranged therein, and a circumference of a portion of the wound portion which extends between the insert hole and the tip portion is covered with the resin.

22. The solder joint structure according to claim 21, further comprising a second solder arranged to join the metal pin and the lead wire to each other; wherein
the solder layer is made of a first solder; and
the second solder is arranged to have a silver content by weight percentage smaller than that of the first solder.

23. A solder joining method comprising the steps of:
a) winding an aluminum wire around a metal pin in a shape of a prism or a circular or substantially circular cylinder to define a wound portion; and
b) defining a solder layer to join the metal pin and at least one portion of the wound portion to each other through soldering with application of an ultrasonic wave; wherein
the step b) causes, in the at least one portion of the wound portion, a portion of the aluminum wire to disappear or be eliminated in a cross-section perpendicular or substantially perpendicular to a direction in which the aluminum wire extends.

\* \* \* \* \*